INVENTOR
Norman William White
BY
Baldwin & Wright
ATTORNEYS 3,315,034

TELEVISION CAMERA SYSTEM FOR AUTOMATICALLY MAINTAINING AN OPTIMUM BEAM INTENSITY

Norman William White, Harpenden, England, assignor to Marconi Instruments Limited, London, England, a British company Filed May 27, 1963, Ser. No. 283,324
Claims priority, application Great Britain, June 20, 1962, 23,737/62
11 Claims. (Cl. 178—7.2)

Figure 1:
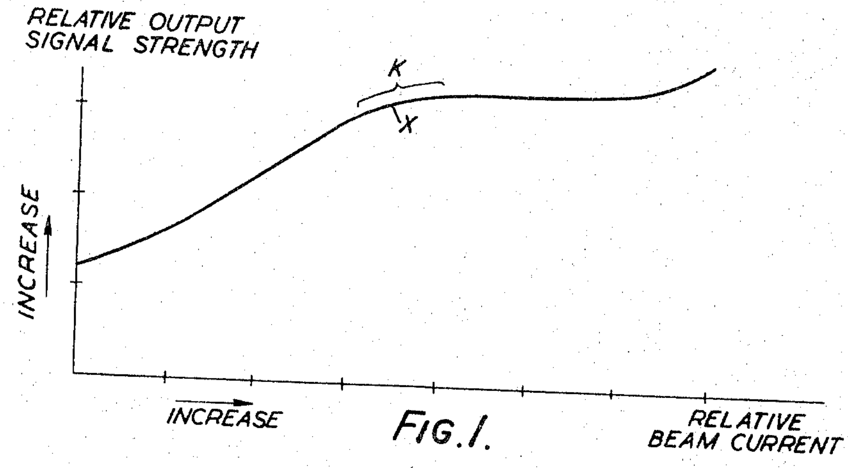

This invention relates to television cameras (in which term is included so-called image amplifiers) and the like, and more specifically to television cameras incorporating camera cathode ray tubes of the storage target type, i.e., of the type in which an image projected on to a photo-cathode is translated into an electrical charge image on a target structure which comprises a very large number of discrete electrical charge storing elements and which is scanned by a scanning cathode ray tube to develop video signals representative of the light and shade of different points in the original image. Camera cathode ray tubes of the storage target type are, of course, well known, one widely used example being the so-called "Image Orthicon" tube. Another example is the so-called "Vidicon" tube.

The invention seeks to overcome a serious difficulty which arises when a television camera incorporating a camera tube of the storage target type is required to "view" subjects of widely differing light brightness or levels ranging from quite ill-lit subjects up to quite bright ones. This requirement does not often arise in ordinary broadcast television practice—though it may arise in special cases of such practice and may fairly often arise in closed circuit television for industrial purposes—because, in ordinary broadcast television practice it is usual to suit the lighting of the subject to the camera employed. The requirement, however, is a general one in television cameras for X-ray work. For such work a television camera is used to "view" a subject constituted by a presentation on an X-ray screen or, if an image intensifier tube is employed, to "view" a subject constituted by the presentation on the screen of the intensifier tube which in turn "views" an X-ray screen. In such cases as these the general light level in the subject or in different parts of it, may be greatly varied within a very wide range. To quote a practical figure it is by no means unusual for the camera tube to have to contend with changes of light level of a ratio of the order of 1000/1. In such cases difficulties arise because, as is well known, an image orthicon or like tube of the storage target type requires, in order to provide video output signals utilisable for the production of a satisfactory television reproduction of a subject of given brightness or light level, operating adjustments—and in particular adjustment of the intensity of the target scanning beam in the tube—which are quite different from those required if the subject is of materially different brightness or light level. If the target scanning beam in the tube is not of the optimum value to suit the brightness of the particular subject being "viewed" by the camera tube there may be most serious degrading of the quality of the ultimate television reproduction. Thus, for example, if the X-ray presentation contains very bright parts—as it may have to do when a high exit dose of X-ray is, for medical reasons, required—and the target scanning beam is of insufficient intensity fully to discharge the target elements carrying charges corresponding to those bright parts, whole areas of the subject may be lost from the ultimate television reproduction. This effect—loss of areas at and near bright parts—is commonly known as "peeling." Hitherto, in order to meet difficulties of this nature, it has been customary practice to provide television cameras for X-ray work with means for manually adjusting the target scanning beam intensity of the Image Orthicon or like tube employed in the camera. Adjustment has commonly been provided in steps—for example five steps—obtainable by selective operation of push-buttons each of which gives a different pre-set value of target scanning beam intensity and, where necessary, an appropriate alteration of the gain of the normally provided video amplifier. In practice, the radiologist looks at the presentation on the screen of the television reproducer tube reproducing the video signals from the camera tube and adjusts the X-ray intensity and selectively operates the push-buttons until he gets what seems to him to be the best result. The need for adjustment in this way is a serious defect: it is not only a nuisance to the radiologist but takes substantial time and it is obviously desirable for a patient to be subjected to X-rays for as short a time as possible. The present invention seeks to overcome these defects. Moreover, with adjustment in steps—and for practical reasons it is difficult to arrange for continuous manual adjustment—optimum results are comparatively infrequently obtainable.

Before describing the invention a property of Image Orthicon and other camera cathode ray tubes of the storage target type will first be explained, for this property is utilised in carrying out the invention. The property in question is this: the characteristic curve connecting video output signal strength (ordinates) with target scanning beam intensity (abscissae) for a given fixed light intensity on the photo-cathode of a camera tube of the type referred to exhibits a fairly well marked "knee" over which the rate of change of output signal strength with beam intensity changes markedly, the slope of the characteristic curve below the knee being substantially steeper than that above the knee over which the said rate of change decreases substantially with increase in beam intensity. This is illustrated in FIGURE 1 of the accompanying drawing which shows a typical characteristic curve for a present-day good quality Image Orthicon tube having a certain fixed light illumination of its photo-cathode. The ordinates are relative output signal strength and the abscissae relative beam currents. The knee is indicated by the bracket K. Below the knee i.e., to the left of the knee, the slope is substantially greater than above the knee, where the slope is relatively small. The optimum operating point for the particular tube for which FIGURE 1 is drawn, when its photo-cathode is exposed to the particular light level for which FIGURE 1 is also drawn, is in the knee, i.e., at or near the point X.

According to this invention a television camera incorporating a camera cathode ray tube of the storage target type includes means for developing a control signal dependent on the maximum peak output signal strength of the tube integrated over a period of time which is long relative to the time taken to scan across one storage element of the target in the tube and means for utilising said control signal automatically to vary the target scanning beam intensity in the tube with variation in brightness of the subject "viewed" in such manner as to maintain the tube operating point at or near the knee of the output signal strength beam intensity characteristic appropriate to the brightness of the subject. Accordingly, if the brightness of the subject is changed, so that the characteristic which applies changes and the optimum value of beam current also changes, the said current is automatically changed to, or near, the new optimum value.

Preferably, signals derived from the output of the tube are rectified by a peak rectifier and a signal derived from said rectifier and superimposed upon a bias potential is applied as the control signal to a beam intensity controlling electrode of the tube. The bias potential is conveniently made manually adjustable. Also it is convenient to feed output from the tube to the peak rectifier through an amplifier of adjustable gain.

Preferably, the control signal is derived by employing the rectifier output to modulate recurrent pulses in amplitude, A.C. coupling the modulated pulses to a further peak rectifier and superimposing the resultant on the bias potential. The recurrent pulses may conveniently be pulses derived from the normally provided line synchronising pulse source utilised for producing line scanning in the tube.

Preferably also the output from the peak rectifier rectifying signals from the output of the tube is also utilised to provide automatic gain controlling potential for an amplifier provided for amplifying the output signals from the tube and supplying them to the utilisation means therefor, i.e., normally to a television reproducer. Where the output from the peak rectifier rectifying signals from the output of the tube is employed to modulate recurrent pulses in amplitude, the modulated pulses are preferably also A.C. coupled to an additional rectifier providing the automatic gain controlling potential.

As has already been explained the optimum operating point of the tube, as respects scanning beam current strength, will change with changes in the light strength on the photo-cathode of the tube. If a graph connecting relative output signal strength of the tube with grid voltage for different values of light strength on the photo-cathode be obtained for a typical camera tube of the storage target type it will be found that the graph is not straight but distinctly non-linear, as indicated by the full line graph in FIGURE 2 of the accompanying drawings connecting relative output RO (ordinates) with relative grid voltage RI (abscissae).

Figures 2, 3:
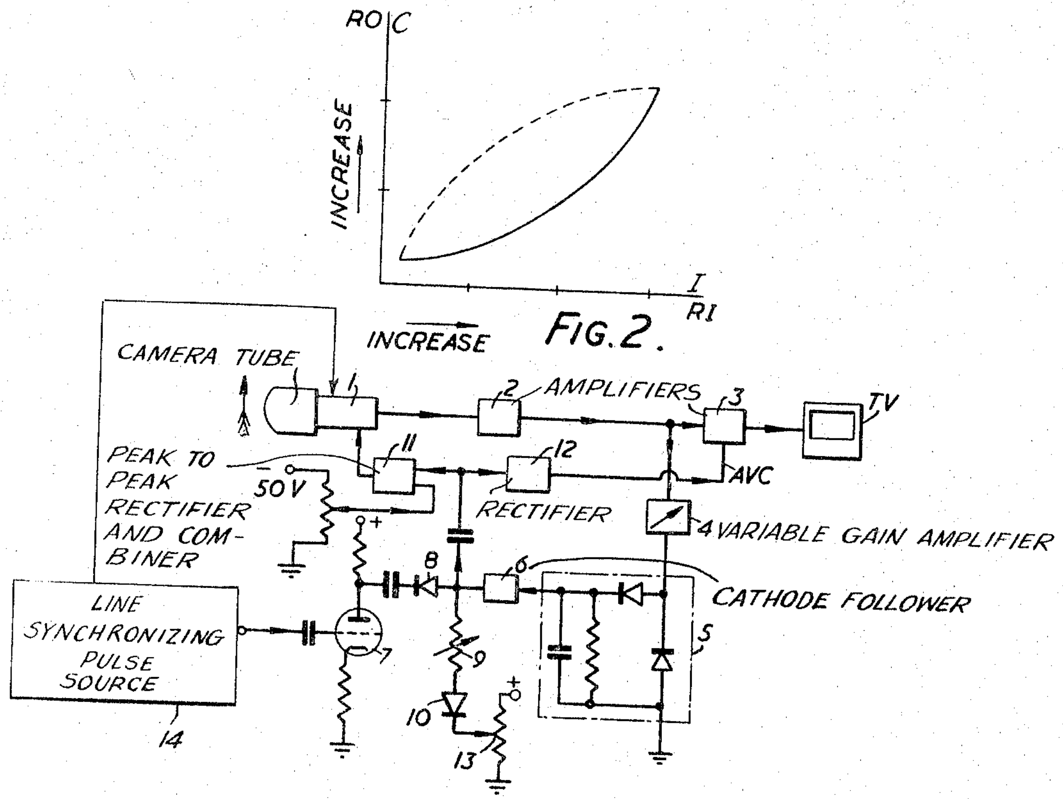

In accordance with this invention, the means for developing the control signal includes the means for automatically varying the relation of the input vs. output characteristics of such means for developing the control signal in accordance with the dashed line curve in FIGURE 2 for different values of light strength on the photo-cathode of the tube. Where the output from the peak rectifier rectifying signals from the output of the tube is employed to modulate recurrent pulses in amplitude, a convenient way of achieving the required curvature compensation is by means of a characteristic-shaping circuit which includes a resistance, a diode and a source of fixed potential in series between a lead carrying output derived from said peak rectifier and earth. The resistance and/or the fixed potential is or are preferably adjustable. With ideal adjustment and taking the case of a tube to which the full line curve of FIGURE 2 applies, the adjusted curvature will be as shown by the broken line curve of FIGURE 2 connecting relative input signal strength I (which is the amplified output of the tube) to the rectifier with control signal strength C to the tube (which is applied as input to the tube grid).

One embodiment of the invention, as applied to a camera for "viewing" and X-ray screen, is shown in simplified block diagram form in the FIGURE 3 of the accompanying drawings.

Referring to FIGURE 3, an X-ray screen picture is represented by the arrow and is "viewed" by an image orthiconcamera tube 1 of normal construction and operated in the usual well known way by means, not shown. Video output from tube 1 is amplified by an amplifier 2 and after further amplification by an amplifier 3, fed to a television reproducer TV of any well known suitable type. The amplifier 3 is fitted with gain control means actuated by potential fed to it over the lead AVC.

Output from amplifier 2 is fed, after further amplification in an amplifier 4 of manually adjustable gain, to a peak-to-peak rectifier unit 5 having a time constant which, though relatively short, is long in relation to the time taken for the scanning beam in the tube to scan one charge storage element of the target. The time constant is not critical but a convenient practical value is equal to the time taken to scan from, say, 10 to 20 fields, i.e., to scan the target 10 to 20 times. The rectified output is fed to a cathode follower 6 whose output terminal is connected to earth through a characteristic-shaping circuit consisting of an adjustable resistance 9, a diode 10, and an adjustable source of potential including a potentiometer 13. Recurrent pulses from the normally provided line synchronising generator 14 are applied to the control grid of a valve 7 whose anode is connected through a circuit including a condenser and the diode 8 to the output terminal of the cathode follower. This terminal, at which will appear line frequency pulses of amplitude controlled by the output from the cathode follower, is capacity coupled by the coupling condenser shown to a unit 11 which incorporates a peak-to-peak rectifier and superimposes the rectified resultant upon a bias potential obtained from an adjustable potentiometer as indicated. The output from unit 11 is applied to the beam intensity controlling electrode in the tube 1.

In the embodiment shown in FIGURE 3, the shaping circuit governs the relation between the voltage amplitude at the output of the cathode follower 6 and the voltage amplitude applied to the grid of the tube 1. Once the tube 1 is set up to operate on the "knee" K of FIGURE 1 (by adjusting the standing bias applied to the grid of the tube 1 from the potentiometer for a particular light level) the gain of the feedback loop is adjusted by adjusting the gain of the amplifier 4 in conjunction with the shaping circuit adjustments, namely rheostat 9 and potentiometer tap 13. The point at which diode 10 conducts, thereby reducing the gain of the feedback loop, and the degree of its conduction are, of course, governed by the settings of rheostat 9 and potentiometer 13. With both the gain and gain characteristic of the feedback loop correctly set, the gain of the whole loop including the tube 1 is slightly above unity on the curve in FIGURE 1 below the knee K, and below unity on the curve beyond the knee K. The tube is thus maintained near its optimum operating point X on the knee K. FIGURE 3 is, however, a simplified block diagram of one embodiment.

The output terminal of the cathode follower is also capacity coupled by the aforesaid coupling condenser to a rectifier 12 the output from which constitutes the automatic gain controlling potential for the amplifier 3 and is arranged to decrease the gain of the said amplifier with increase in modulated pulse amplitude.

The adjustments of the characteristic-shaping circuit are such that, if the full line graph of FIGURE 2 is correct for the tube 1, the curve connecting input to amplifier 4 (abscissae) with rectified output from unit 11 (ordinates) is, as nearly as practicable, that shown by the broken line graph of FIGURE 2.

The whole arrangement is such that the gain round the loop comprising tube 1, amplifiers 2 and 4 and 11 exceeds unity over the part of the curve of FIGURE 1 below the knee K but is less than unity over the part adjacent to and beyond the said knee. Accordingly the tube 1 is automatically maintained near the optimum operating point X in the knee.

I claim:

1. In a television camera including a camera cathode ray tube of the storage target type, said cathode ray tube having a characteristic curve of output signal strength vs. beam current which includes a knee portion at which said characteristic curve changes from one slope to another, the improvement comprising means for generating a control signal dependent on the maximum peak output signal strength of said cathode ray tube integrated over a time period which is long relative to the time required to scan across one storage element of the target therein, means for applying said control signal to said cathode ray tube to automatically vary the target scanning beam intensity of the tube, and said means for generating said control signal including means for automatically and non-linearly varying the relation between the amplitude of said control signal and the output signal strength of said cathode ray tube to maintain the tube operating point near said knee portion of said characteristic curve.

2. A television camera as defined in claim 1 wherein said means for generating said control signal comprises a peak rectifier coupled to the output of said cathode ray tube, means for deriving said control signal from the output of said rectifier, means for generating a bias potential and for superimposing said control signal upon said bias potential, and means for applying said control signal and said bias potential to the beam intensity controlling electrode of said cathode ray tube.

3. A television camera as defined in claim 2 and also including means for manually adjusting the level of said bias potential.

4. A television camera as defined in claim 2 and also including an adjustable gain amplifier coupled between the output of said cathode ray tube and the input of said peak rectifier.

5. A television camera as defined in claim 2 wherein said means for deriving said control signal includes a modulator circuit, means for applying recurrent pulses to said modulator circuit, means for modulating the amplitude of said recurrent pulses in accordance with the output of said peak rectifier, said modulated recurrent pulses comprising said control signal.

6. A television camera as defined in claim 5 and also including a line synchronizing pulse source coupled to said cathode ray tube to produce line scanning in the tube, said line synchronizing pulse source being coupled to said modulator circuit and the output of said line synchronizing source comprising said recurrent pulses applied thereto.

7. A television camera as defined in claim 6 and also including an amplifier coupled between the output of said cathode ray tube and the utilization means therefor, said amplifier including an automatic gain control circuit, and said control signal being coupled to said automatic gain control circuit to automatically vary the gain of said amplifier in accordance with the maximum peak output signal of said cathode ray tube.

8. A television camera as defined in claim 2 wherein said means for varying the relation between the amplitude of said control signal and the output signal strength of said cathode ray tube comprises a characteristic shaping circuit coupled to the output of said peak rectifier, said characteristic shaping circuit including a resistor, a diode, and a potential source coupled in parallel with the output of said peak rectifier circuit.

9. A television camera as defined in claim 5 wherein said means for varying the relation between the amplitude of said control signal and the output signal strength of said cathode ray tube comprises a characteristic shaping circuit coupled to the output of said peak rectifier, said characteristic shaping circuit including a resistor, a diode, and a potential source coupled in parallel with the output of said peak rectifier circuit.

10. A television camera as defined in claim 6 wherein said means for varying the relation between the amplitude of said control signal and the output signal strength of said cathode ray tube comprises a characteristic shaping circuit coupled to the output of said peak rectifier, said characteristic shaping circuit including a resistor, a diode, and a potential source coupled in parallel with the output of said peak rectifier circuit.

11. A television camera as defined in claim 7 wherein said means for varying the relation between the amplitude of said control signal and the output signal strength of said cathode ray tube comprises a characteristic shaping circuit coupled to the output of said peak rectifier, said characteristic shaping circuit including a resistor, a diode, and a potential source coupled in parallel with the output of said peak rectifier circuit.

References Cited by the Examiner

Zimmerman and Mason: "Electronic Circuit Theory," Wiley, New York, 1959, pp. 106, 107.

Mason and Zimmerman: "Electronic Circuits Signals and Systems," Wiley, 1960, pp. 569–572.

Luther: "Image Orthicon Automatic Beam and Gain Control," R.C.A. Technical Note TN No. 389, June 1960.

DAVID G. REDINBAUGH, *Primary Examiner.*

R. L. RICHARDSON, J. McHUGH, *Assistant Examiners.*